(12) United States Patent
Minalia et al.

(10) Patent No.: US 12,465,853 B2
(45) Date of Patent: Nov. 11, 2025

(54) SYSTEMS AND METHODS OF PERSPECTIVE POLYGON-OFFSET LAYERING

(71) Applicant: NINTENDO CO., LTD., Kyoto (JP)

(72) Inventors: Timothy Gail Minalia, Redmond, WA (US); Jonathan Johnson, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 308 days.

(21) Appl. No.: 18/459,946

(22) Filed: Sep. 1, 2023

(65) Prior Publication Data

US 2025/0073582 A1    Mar. 6, 2025

(51) Int. Cl.
*A63F 13/52* (2014.01)
*G06T 15/20* (2011.01)
*G06T 15/40* (2011.01)

(52) U.S. Cl.
CPC .............. *A63F 13/52* (2014.09); *G06T 15/20* (2013.01); *G06T 15/405* (2013.01)

(58) Field of Classification Search
CPC ....... G06T 15/20; G06T 15/405; A63F 13/52; A63F 2300/66; A63F 2300/6653
See application file for complete search history.

*Primary Examiner* — Lawrence S Galka
(74) *Attorney, Agent, or Firm* — Nixon & Vanderhye P.C.

(57) ABSTRACT

Techniques for rendering perspective views of three-dimensional objects that are used in two-dimensional gameplay are provided. The three-dimensional objects are arranged into different layers for a perspective-projection scene. During the rendering process, the objects in the scene are drawn or otherwise tested against a depth buffer. The coordinates that are used for the depth buffer for each object are offset based on which layer has been assigned to that object.

20 Claims, 6 Drawing Sheets

SYSTEMS AND METHODS OF PERSPECTIVE POLYGON-OFFSET LAYERING

CROSS REFERENCE(S) TO RELATED APPLICATION(S)

Not applicable.

TECHNICAL OVERVIEW

The technology described herein relates to rendering images. More particularly, the technology described herein relates to generating perspective views of three-dimensional objects that are used in two-dimensional gameplay by offsetting the objects in a depth buffer.

INTRODUCTION

Rendering is a process by which images are generated from models and other data stored in a computer. It is used in, among other areas, movies, computer-aided design, and video games.

Video games can be complex to create. For example, unlike movies or other types of applications or media, video games typically process player input in real-time with the output provided to a player (e.g., images displayed on a display device). The images are generated at a rate of, for example, 30 times per second. Different techniques can be used in video games to provide different types of perspectives or gameplay. Examples include two-dimensional gameplay in which movement in the game space allows left/right and/or up/down movement. Classic examples of two-dimensional gameplay are Pong and Super Mario Bros. for the Nintendo Entertainment System (NES).

Another technique for computer games allows for controlling objects within a three-dimensional game space—players can control objects in x, y, and z directions. Views of the three-dimensional game space are rendered by using virtual camera techniques and shown to the player on a display device. A classic example of a game with three-dimensional gameplay is GoldenEye 007 for the Nintendo 64.

Different techniques for rendering images can thus be used for video games. However, it will be appreciated that new and improved techniques, systems, and processes are continually sought after in this area of technology.

SUMMARY

In certain example embodiments, a computer system is provided that renders a three-dimensional scene for gameplay that is two-dimensional. The view of the three-dimensional scene is from a perspective view. During the rendering process for the scene, objects (e.g., the polygons thereof) are offset when written to the depth buffer according to one of a plurality of layers that the object is assigned to. In certain examples, the techniques herein allow for sorting three-dimensional objects (e.g., three-dimensional meshes) in a perspective-projection scene by offsetting the polygons of a mesh when they are drawn into the depth buffer. In certain examples, the meshes in the scene are organized into categories at runtime. The categories are used to specify which layer the mesh should be shown in. The layer for the mesh is used to control the offset during depth buffer testing. Accordingly, depth buffer testing may be performed regardless of an object's position in the virtual space for the scene that is being generated.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

In many places in this document, software modules (e.g., a game application), software components, software engines (e.g., a rendering engine), and/or actions performed by such elements are described. This is done for ease of description; and it should be understood that whenever it is described in this document that a software module or the like performs any action, the action is in actuality performed by underlying hardware elements (such as a processor, hardware circuit, and/or a memory device) according to the instructions that comprise the software module or the like. Further details regarding this are provided below in, among other places, the description of FIG. 5.

Overview

In certain example embodiments, techniques for rendering perspective views of three-dimensional objects that are used in two-dimensional gameplay are provided. The three-dimensional objects (e.g., three-dimensional meshes, etc.) are arranged into different layers for a perspective-projection scene. During the rendering process, the objects in the scene are drawn or otherwise tested against a depth buffer. The coordinates that are used for the depth buffer for each object are offset based on which layer has been assigned to that corresponding object. This technique allows for separating the view order from the world space coordinates of the objects—while still using a depth buffer and other graphical pipeline techniques to render images of the three-dimensional scene. In certain examples, the techniques herein allow for creation of a two-dimensional game (e.g., two-dimensional gameplay) with three-dimensional scenes—while still being able to preserve or maintain an original draw order, but also adjust the view order. This technique also helps to avoid 3D mesh clipping for overlapping objects in the scene.

Figure 3:
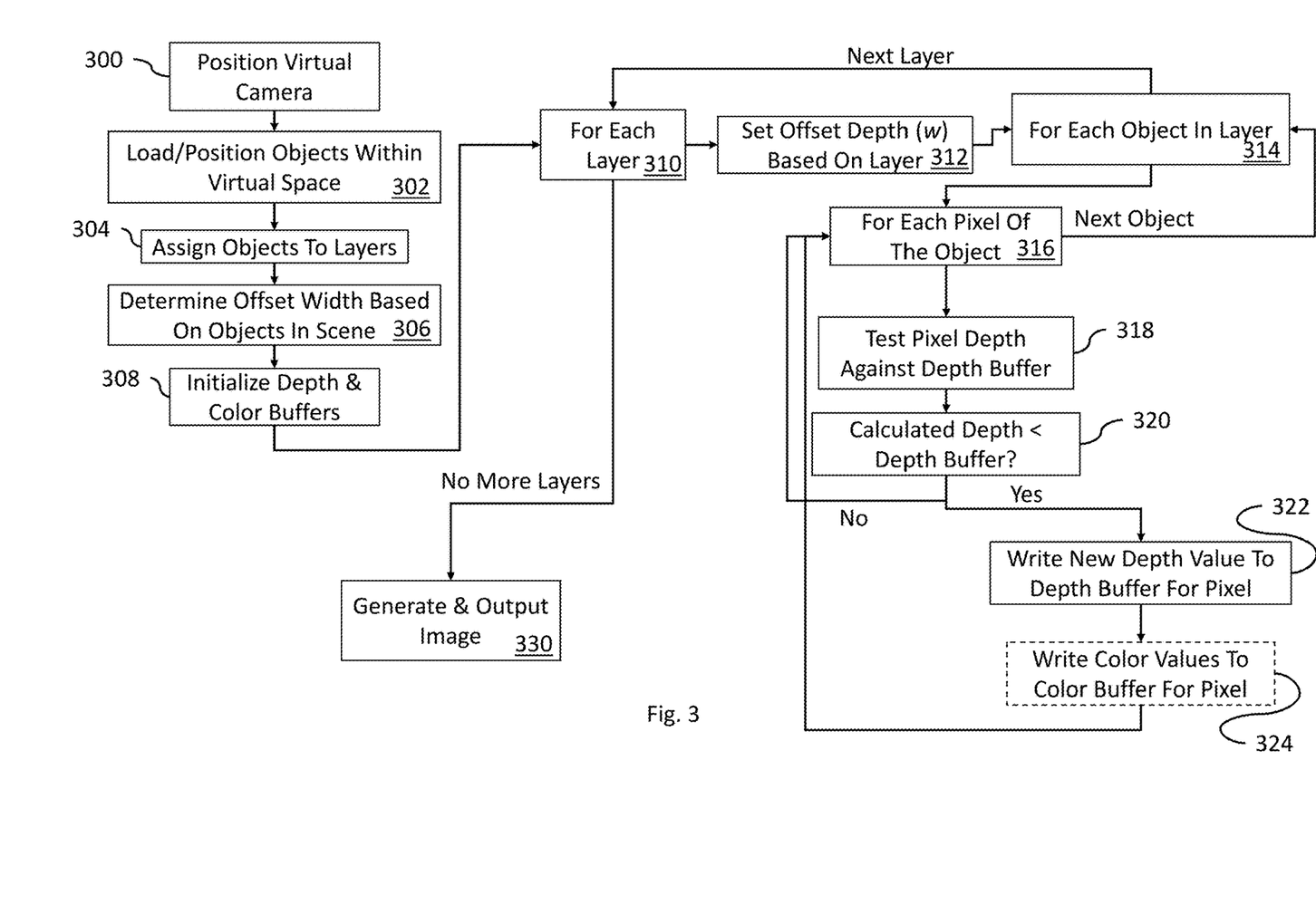
FIG. 3 is a flow chart of elements included as part of a rendering process according to certain example embodiments.

In many places in this document, software (e.g., modules, software engines, services, applications and the like and actions (e.g., functionality such as shown in FIG. 3) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 5.

Description of FIGS. 1A-2B; Examples

Figure 1A:
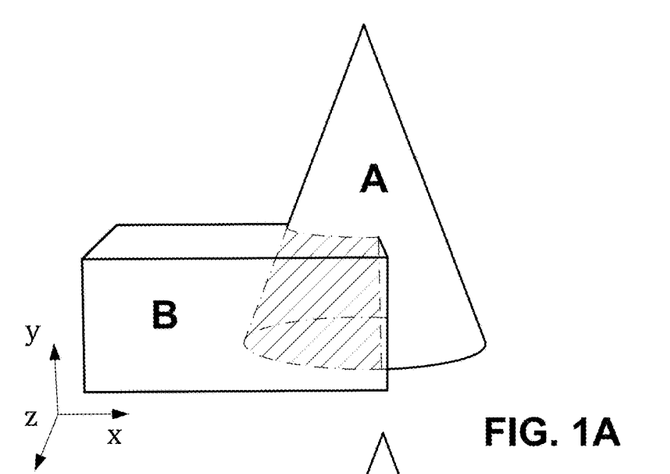
FIGS. 1A-1C are wireframe views that illustrate different techniques for rendering objects according to certain examples.
Figure 1B:
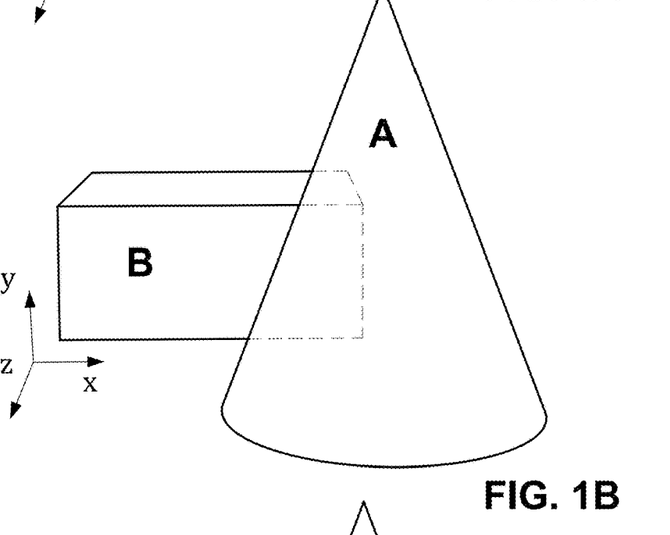
Figure 1C:
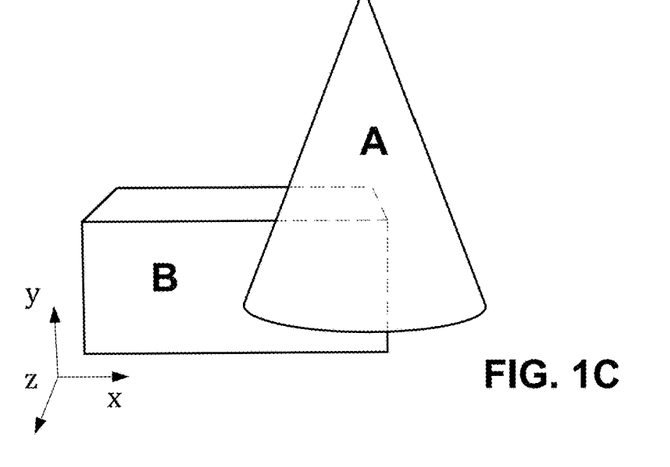
Figure 2A:
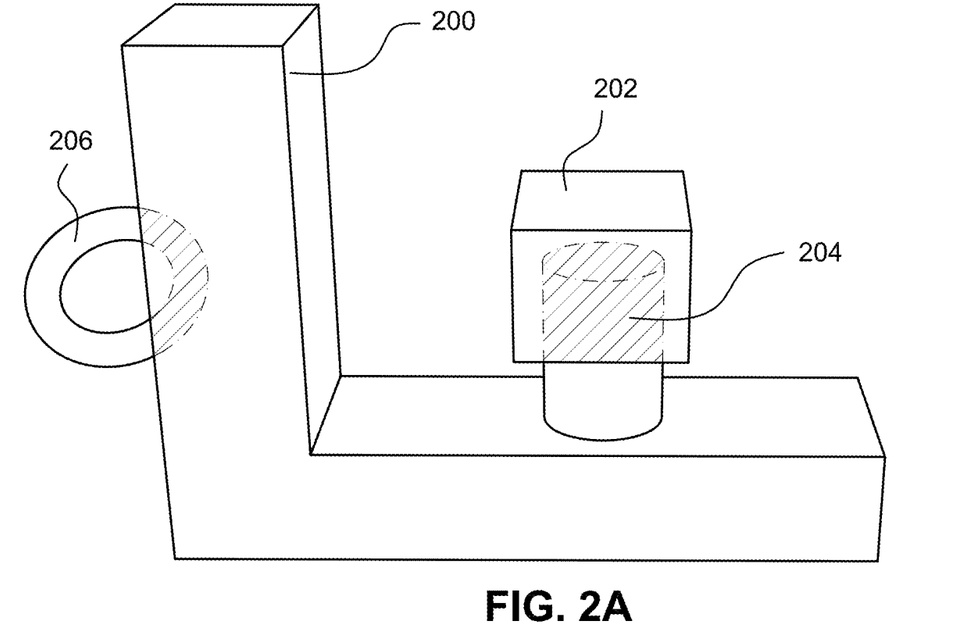
FIGS. 2A-2C are wireframe views that illustrate different techniques that may be used for rendering objects as part of a three-dimensional video game scene according to certain example embodiments.
Figure 2B:
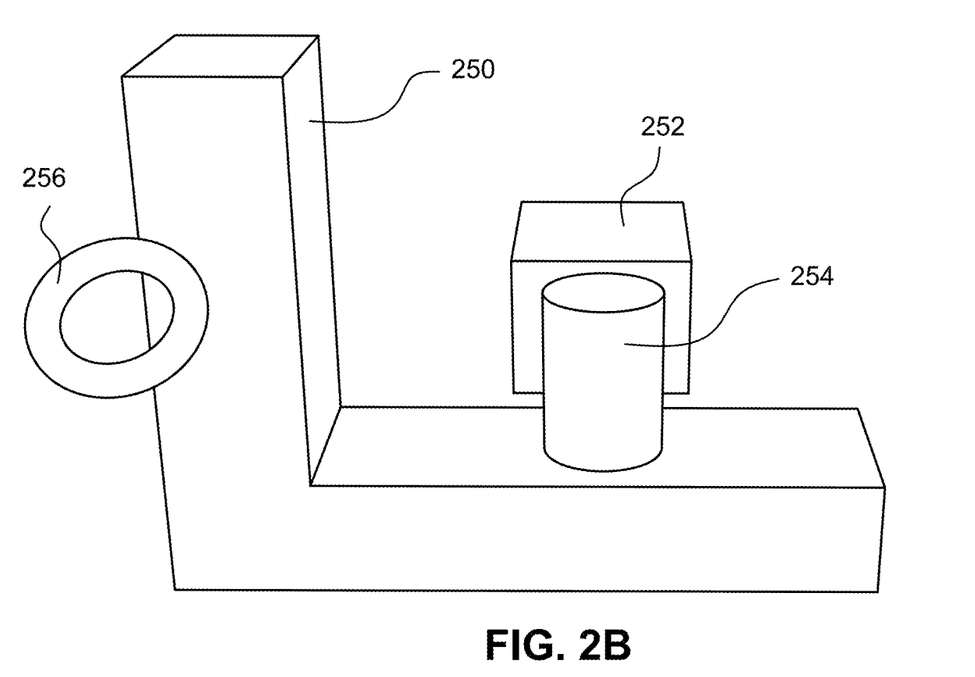

FIGS. 1A-2B are wireframes views of different types of images that may be generated according to certain examples. FIGS. 1C and 2B correspond to images that may be generated using the techniques discussed herein (e.g., in connection with FIG. 3) while 1A, 1B, and 2A correspond to other types of rendering techniques.

Different types of rendering techniques may be implemented in connection with certain example embodiments. In certain examples, rendering techniques for two-dimensional gameplay are provided. A possible issue with two-dimensional gameplay is that it may be desirable to have multiple objects or elements occupying the same area in the two-dimensional space (or view) for the video game. An illustrative example of this may be handling a video game character and geometry or terrain within a scene. As another example, when the character is climbing a ladder or in front of a background object (such as a table, a tree, or the like). When these types of situations occur (objects occupy the same location in the game space) one or more negative results can occur due to two (or more) objects overlapping in space.

An illustrative example of what can occur when two objects overlap in a game space is shown in FIG. 1A. In this example object A and object B occupy the same location within a virtual game space. This results in object A and object B clipping into one another. If the game space is a three-dimensional game space that uses a depth buffer for sorting (e.g., for visibility sorting), this may result in z-fighting or other negative rendering artifacts. This could occur even if it was desirable to have object A (e.g., a game character) and object B (e.g., a table) displayed in front of B (e.g., to have a game character walk in front of the table). This may occur even if the objects do not occupy exactly the same space due to the floating-point precision of the depth buffer. Thus, when objects occupy the same space, one or more techniques may be needed in order to display a desired view or look to a user as part of the game play.

One example of a rendering technique may work for two-dimensional gameplay that uses orthographic projection and two-dimensional quads (e.g., that are flat and exist in one plane). Two-dimensional quads may be advantageous in certain examples due to the relative ease of creating them. With this technique the two-dimensional quads may be manually sorted by assigning, for example, each quad an order in which it will be rendered. In certain examples, this type of approach may give control (e.g., full control) over the draw order of the quads. However, as 2D quads are used and the projection is orthographic, the scene will not be three-dimensional (including not having perspective or parallax). Moreover, the sorting for this technique may be handled in software without relying upon faster hardware supported solutions (such as a GPU provided depth buffer).

Another rendering technique that may be used in connection with certain examples is a technique that uses orthographic projection, three-dimensional meshes (e.g., created out of triangles or other polygons), and that is rendered with the assistance of depth buffer sorting (e.g., via a GPU provided depth buffer). With this technique, the rendered scene may look three-dimensional (e.g., due to the 3D meshes) and the draw order/sorting of objects within a scene can be controlled (e.g., via a depth buffer) by moving the objects closer/farther away from a virtual camera. However, this type of approach may have a flat look (e.g., because the scene does not include perspective). Furthermore, in order to handle parallax, objects in the foreground and background may need to be handled manually rather than using certain graphical pipeline techniques.

Another rendering technique that may be used in connection with certain examples is a technique that uses perspective projection with three-dimensional meshes and depth buffer sorting. With this technique a scene includes a perspective view and parallax. However, placing objects closer or farther away from the viewpoint causes those objects to appear larger/smaller than other objects due to the perspective projection. This is illustrated in connection with FIG. 1B, where "A" is moved closer to the viewpoint (and in front of "B") and is thus larger in the view than B. A depth buffer may be used to sort A (and the pixels thereof) in front of "B". While this type of technique may be used in connection with certain examples (e.g., moving the objects closer/farther from a viewpoint), such techniques may not be desirable in connection with 2D gameplay (or gameplay that is not fully 3D). This is because, referring to, for example, FIG. 1B, when 2D gameplay is desired, it may be advantageous for objects A and B to appear next to one another (e.g., that they are at the same depth within the scene, on the same z-plane, or spaced the same distance from a viewpoint)—as opposed to being farther apart as apparently shown in FIG. 1B.

In contrast to the approach shown in FIG. 1B, in certain examples a technique of using a perspective view, with three-dimensional models that uses a depth buffer for sorting can be used to generate images for a two-dimensional gameplay that avoid one or more issues used with the other techniques described herein.

FIG. 1C is a wireframe view that shows object A placed in front of object B, but being rendered next to, or at the same depth (e.g., the distance from the viewpoint) as object B. More specifically, all of object A (e.g., the polygons and pixels of the object) is forced to be drawn in front of B, even though both A and B are 3D objects and in 'reality' would be clipping into object B (e.g., as shown in FIG. 1A).

Note that between FIGS. 1A and 1C, that objects A and B are located in the exact same world space positions within the game space. Moreover, both of these images represent renderings that use, for example, a GPU depth buffer for sorting. However, the technique used in connection with FIG. 1C (and described in greater detail below) results in having object A being drawn such that the GPU depth buffer sorts that object in front of object B. Note that this approach may look different from other 3D approaches (e.g., those that have full three-dimensional control). Indeed, the approach shown in FIG. 1C, and as detailed herein, may provide for one or more desired outcomes (e.g., in terms of how a resulting image is rendered) for a game that includes two-dimensional gameplay.

Figure 2C:
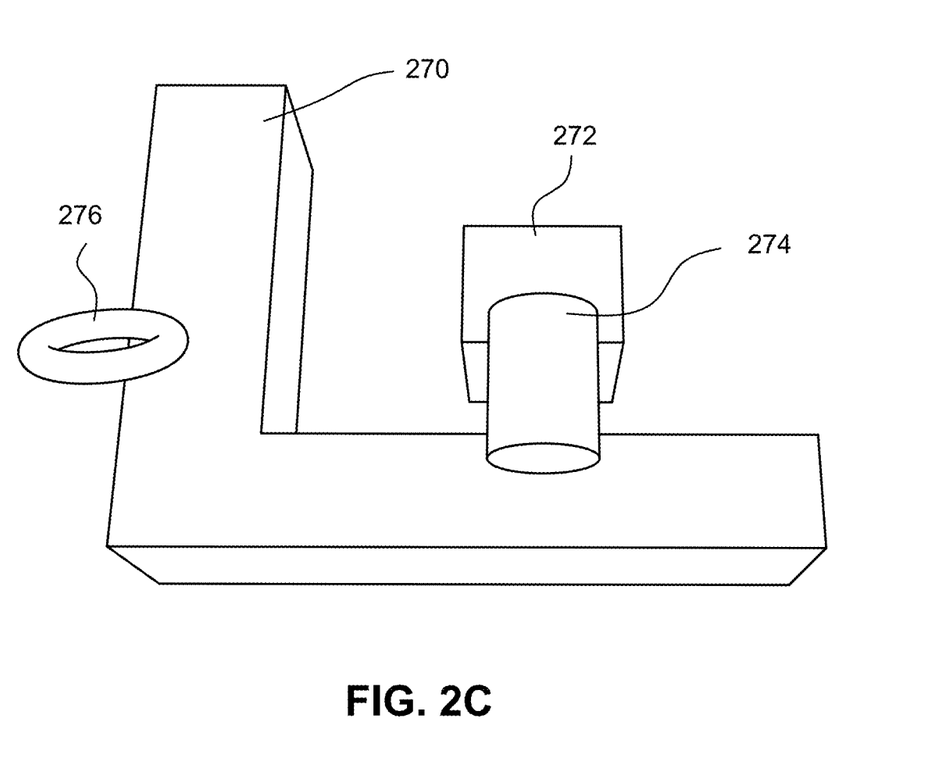

FIGS. 2A-2C further illustrate different techniques for rendering objects in connection with two-dimensional gameplay of three-dimensional objects that are located in a three-dimensional game space. The objects in these three scenes correspond to one another (200/250/270; 202/252/272; 204/254/274; and 206/256/276)

FIG. 2A is a wireframe of a game scene using two-dimensional gameplay that corresponds to that shown in FIG. 1A. In this example, object 204 is an object (e.g., a game character) controlled by a user that is moving along object 200 (e.g., a terrain object). There is also another object 202 that is, for example, a platform or other object. For example, the user could control their object to jump onto object 202. In this example, the user has moved their object 204 along object 200. However, when this occurs object 204 clips into 202. This is because both objects 202 and 204 are located at the same distance from the viewpoint (e.g., virtual camera). This situation may then cause z-fighting, or other rendering artifacts, as the rendering process is unable to determine which of object 204/202 is in front and which is behind. Note that in some examples, part of the area where the objects clip into one another may show some of A and some of B. This may be due to the z-fighting problem noted above where the rendering engine is unable to consistently determine which object (or pixels thereof) is in front of the other.

FIG. 2A also includes object 206 that is moving laterally across the screen towards object 204. This may be, for example, a projectile or other object that is part of the video game being played. This object moves to a location that overlaps with object 200 is located and clips into the terrain that is located there. A downside of this is that because object 206 is moving, it may be desirable to continually display that object to the user so they can, for example, move out of the way of the object (e.g., dodge it). However, 206 begins to clip into 200 and may not be displayed. This is because the front surface of 200 may be closer to the camera than 206—e.g., because 200 occupies a wider amount of space in the z-direction than 206.

To address one or more of the issues shown in FIG. 2A, the rendering of the objects in the scene may be adjusted as shown in FIG. 2B. In FIG. 2B, the objects are all at the same location within a three-dimensional game space as shown in FIG. 2A. However, in FIG. 2B, the view order of the objects has been adjusted by modifying the depth value that is used for testing which object to draw with a depth buffer (e.g., on a GPU). As discussed in connection with FIG. 3, an offset is applied to the objects to arrange them so that 206 and 204 are displayed in front of 200 and 202—without modifying the positions of the objects within the three-dimensional game space (e.g., without moving them closer to the location of the virtual camera as is done in FIG. 1B).

One potential issue with this approach is that by modifying the view order (e.g., by adjusting the depth value used for the depth buffer test), that objects can appear in ways that may make the resulting scene seem incorrect to a user. FIG. 2C illustrates this issue.

In FIG. 2C the virtual camera that is used to generate the image has been adjusted to view the objects from below. In other words, the virtual camera is moved "down" in the virtual game space and then oriented (e.g., its pitch) adjusted to look up at the objects. Note that the objects in FIG. 2C are located at the same world space positions as in FIG. 2B and the same offsets have been applied to the objects as in FIG. 2B. However, in this case, 274 is not being rendered in a way that seems incorrect. Recall that 274 may correspond to a game character that is being controlled by a user as they walk along a terrain object 270. Accordingly, if the camera is moved to view the game space from below the terrain object, then the image in FIG. 2C of the game scene may be confusing for the user as 274 does not appear to be walking "on" 270. To address this issue, object 270 may be moved in front of 274. However, if this occurs, the scene may still need to have 276 in front of 270 (so that a user can see this object)—while also having 274 remain in front of 272.

As discussed below, dynamically adjusting how the objects are drawn within a scene may be based on the positioning/orientation of the viewing direction of a virtual camera. It will also be appreciated that as more complexity is added to a game (e.g., in terms of more objects in a scene, more rules for how objects can be adjusted, more flexibility for camera movement, and the like) that the complexity of ordering the objects can be increasingly computationally expensive-especially if reordering the objects occurs quickly and/or often. Accordingly, in certain example embodiments, the virtual camera can have a fixed viewing direction or orientation. For example, the virtual camera may only laterally move without changing the pitch/yaw directions of the camera. In some examples, the camera may be controlled to follow the object that is controlled by the player (e.g., the viewing direction is at object 274 as it moves through the game space). In certain examples, a given object may be dedicated to a specific one of the multiple possible layers (e.g., that object will always be in that layer). In certain example embodiments, many, most, or all or the objects within a scene may be associated with a given layer/pre-sorted prior to loading and execution of the game.

In certain examples, additional variables may be used to adjust the viewing order of objects within a scene. As an illustrative example, there may be certain portions of gameplay in which 276 is rendered behind 270. How 276 is presented (whether behind or in front of 270) may be due to the design of, for example, a game level or may be due to use of an ability by the user (or a non-player-character) within the game. Accordingly, the viewing order of objects within a scene may be dynamically, automatically (e.g., without direct control by a user), or manually (e.g., responsive to user instructions to take an action) controlled.

Description of FIG. 3: Rendering

FIG. 3 is a flow chart of steps that may be included as part of a rendering process (also called a render process herein) according to certain example embodiments. The process shown in FIG. 3 may be executed multiple times (e.g., 30, 60, or the like) per second for a two-dimensional game that is being presented to a user. Each time a rendering process is performed (which may include any or all of the elements shown in FIG. 3) it may generate a frame (e.g., an image) that is then output for display. FIG. 2B is an illustrative example of an image that may be created using the rendering techniques described in connection with FIG. 3 in certain examples.

Figure 4:
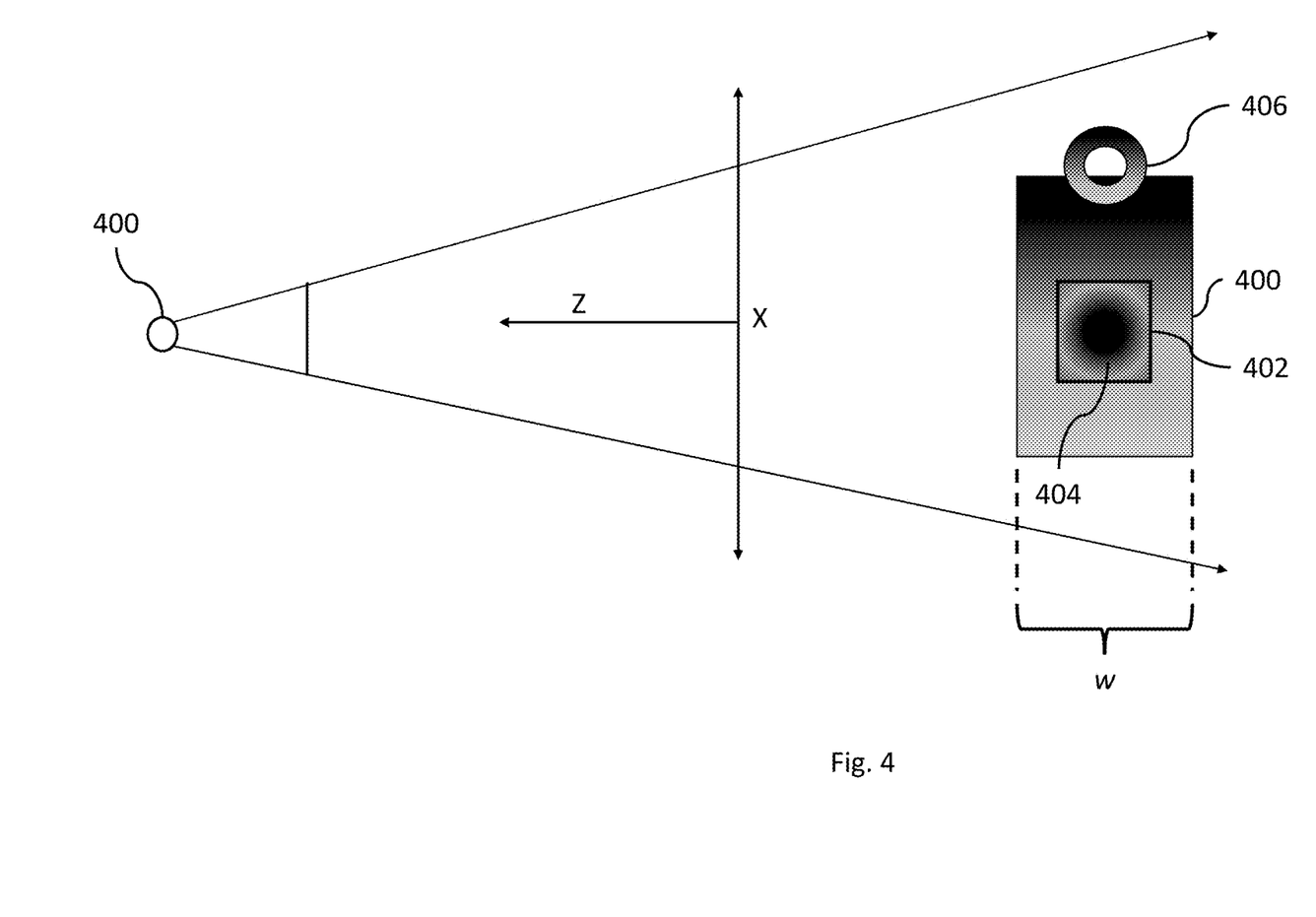
FIG. 4 graphically illustrates how example virtual objects are located within world space coordinates of an example virtual game space according to certain example embodiments.

At 300, a virtual camera is positioned with a virtual game space. An illustrative example of how a virtual camera can be positioned is shown in FIG. 4. As discussed in greater detail herein, the positioning of the virtual camera may affect how the objects are drawn (e.g., what layers they are associated with). In other words, the sorting of the objects into the various layers may be based on or dependent on the particular angle of that is being used by the virtual camera for the perspective viewpoint. For example, as shown in FIG. 2C, when the virtual camera angle is adjusted, the resulting effect of how 274 is shown may not be desirable. Accordingly, the layering for 274 in comparison to 270 may be adjusted based on application need.

In certain example embodiments, the pitch and yaw of the virtual camera is fixed within the virtual space such that the viewing direction is along the same plane (or parallel to such a plane). In certain examples, the virtual camera may be fixed or "move" as a player-controlled object (e.g., a game character or the like) moves through the scene. Accordingly, the positioning of the virtual camera within the virtual space (e.g., the x, y, z position) may be based on or set based on the positioning of a player-controlled object within the game space. If the user provides input to control the player-controlled object to move to the right within the 2D view, then the camera will similarly move to the right. In some examples, the camera may be controlled to only move laterally and thus if the player-controlled object moves up or down, the camera will not also move up/down. In other examples, the camera may follow the player-controlled object up and down as well.

At 302, the objects within the 3D scene are located within the virtual space. For example, referring to FIG. 2B, objects 250, 252, 254, and 256 are all located with the virtual game space. The positions of the objects within the space may be defined by three-dimensional (x, y, and z) world space coordinates. In some examples, each of the objects may be assigned a category label or attribute that defines the type of object. The assignment of these labels may be performed at design time (e.g., when game designers are creating a level or the game, at run time (e.g., when the player is playing the game), or both.

In some examples, objects may only be assigned one label. In other examples, objects may be assigned multiple labels. In some examples, if there are multiple labels assigned, then those labels can be arranged in terms of priority. Illustrative examples of labels may include: terrain, player characters, non-players characters, non-interactable objects, interactable objects, projectile objects, and others. In some examples, the label that is attached to a given object may have additional logic. For example, an object may switch between a projectile object and a non-player character. Thus, objects may have conditions for when one label applies and when another label applies based on, for example, processing that is being performed in a game scene. As another illustrative example, a game may include a number of objects that don't usually interact with one another. However, a given point in the game (e.g., the completion of a level or other triggering event), then those objects may be played in a single specific layer so that they can all interact and look correct within the three-dimensional game space.

At 304, the labels are used to assign each object to one of a plurality of different layers in the scene. As a non-limiting illustrative example there may be 10 different layers for a scene and each object within the scene may be arranged into one of those possible layers. The following are illustrative examples of different layers that may be used in certain example embodiments.

The first layer may be the Intro/Outtro Layer. This layer may be used to present certain objects (which may include a black/blank screen) in front of all other objects within a scene.

The second layer may be a projectile layer. This second layer may be for flying objects. This layer may be designed so that objects that are flying may be seen at all times by the player. An example of a flying object may be object 276 from FIG. 2C.

The third layer may be the character layer. This layer may include all characters within the game or other objects that are dynamic or can be interacted with. In certain examples, the third layer may be split into additional layers (e.g., sub-layers) that separate characters into different layers. This can be used to, for example, show/hide characters within the scene (e.g., behind a tree or the like). Thus, for example, a character could walk in front an NPC during a series of images (e.g., produced by the process in FIG. 3) and then later interact with that same NPC (or walk behind that NPC) in another series of images.

The fourth layer may be a static layer for those other objects within the scene that are static and don't otherwise move within the game space. An example of this may be object 252 in FIG. 2B that may be, for example, a platform or the like. Another example may be certain animated objects within the scene that don't change position.

A fifth layer may be the ground or terrain layer. This layer is generally a layer that allows a player character to walk/run along. An example of this may be object 250 in FIG. 2B. Other layers are also possible depending on application type, the complexity of the scene being rendered and the like.

A sixth layer may be a back layer. This layer may be used to ensure that objects are located in the background.

In certain example embodiments, the angle (e.g., viewpoint direction) and/or position of the virtual camera may be used to determine to calculate which layer an object should be assigned. As an illustrative example, while the position of object 254 may be in front of 250 in FIG. 2B, the scene may shift if the camera is moved to view object 274 from below as shown in FIG. 2C. In this case, if 274 is drawn to the same layer as shown in FIG. 2B, then it will be drawn in front of 270 (as shown in FIG. 2C). However, in this scene it may be more appropriate to draw 274 behind 270—but still in front of 272. Accordingly, the layer that one or more objects are set to may be determined based on the camera angle (or other aspects of gameplay) that is used within that scene. This can allow for new ways to technically handle the view order of objects within a scene as the scene changes.

In certain example embodiments, objects with extended interaction within one another may be sorted into the same layer. In contrast, objects that may have circumstances of prolonged clipping with no or little gameplay interaction are sorted into separate layers.

In any event, each of the objects within a scene is assigned to a layer. In certain examples, this assignment is based on the classification of that object (e.g., when the object is designed/the level is created/etc.).

At 306, the offset that will be used for the rendering process is determined. More specifically, the process determines how far apart each layer should be from one another. In certain examples, this value should be as small as possible—but still wide enough to offset the widest object in the scene that needs to be sorted. This is illustratively shown in FIG. 4 where w is calculated based on the width (e.g., the z-width) of the largest object in the scene-object 400.

In certain example embodiments, the difference between layer depth is the same for all layers. In other examples, the layer depths of each layer are individually calculated. In other words, w may be calculated based on the width of the objects associated with that particular layer. Accordingly, referring to FIG. 4 for this example, if 400, 402, and 404 are all in separate layers (with 406 being in the same layer as 404), then individualized w's may be calculated for each of those layers, the total offset for a given layer may then be calculated by summing the w's associated with those layer "behind" the current layer. In any event the width(es) to be used for the offset for the layers is determined.

In certain example embodiments, the calculation of the offset is determined to be as small as allowed (e.g., to allow more layers), while also preserving floating point precision in connection with the depth buffer. This may also help to decrease artifacting within the rendered scene.

At 308, the depth and color buffers to be used for rendering the scene are initialized. In certain examples, these may be two-dimensional arrays. The depth buffer may carry the depth of the pixel that is to be drawn for the resulting image and the color buffer may carry the color to be drawn for the pixel within the image. In some examples, these buffers may be provided as part of a GPU that will be used to assist in rendering the scene.

Next, at 310, the process iterates over each layer in the scene by subjecting the objects in that layer to rendering processing. In some examples, the layers are randomly selected. In other examples, layers (and objects associated with each layer) are processed from back to front (e.g., the ground is the first layer that is processed). In other examples, the layers are processed from front to back (the intro layer is first processed).

At 312, for each layer, the offset depth is set for objects that are rendered within that layer.

In some examples, this is accomplished by setting a hardware depth offset as follows. PO(s, w*x), where PO is a polygon offset function, s is some scale, w is the width determined from 306 and x is some fixed scalar applied to the w. An illustrative example of using a polygon offset function may be the glPolygonOffset function for OpenGL, with w*x being the units value in the function. Once this is set, then each element (e.g., each interpolated pixel/vertices/ etc.) of an object to be rendered will be offset as defined in the function. In some examples, x may be the layer number (or based on that number). For example, the furthest back layer (e.g., the ground layer) may be assigned 0, with each successively closer layer increasing by 1.

It will be appreciated that in certain example embodiments, using the layers to group objects together can allow for decoupling from the actual polygon offset value that is used for each of those objects. This may be advantageous as the depth space for the depth buffer is different from other spaces (e.g., world space or the like).

As another example implementation, the post projection z position in a shader can be modified with an offset. In other words, the offset may be defined in a shader. For example, the shader depth offset (Z) may be defined as =s*(1.0−Z/W)+o, where Z & W are the Z & W post projection coordinates that are output from the vertex shader, s is some constant scalar value, and o is an offset based off of w determined from 306. In other words, o may be based on w* the current layer number.

In certain examples, both techniques discussed above (the polygon offset command and a shader implementation) may be used. In some examples, certain types of elements within a scene may use the above noted polygon offset command, while others use a shader. In certain example embodiments, particle effects or other in-game effects may be handled via a shader while other in-game objects (e.g., game characters, etc.) are rendered by using the polygon offset command.

The use of these techniques to offset the world space coordinates of the objects (or elements thereof) allows depth buffer values to be scaled or offset in a way that preserves perspective on the objects that are being rendered.

Next, at 314, with the offset values prepared for the object, then each object is subjected to a process that involves the depth buffer. Specifically, each pixel (or other element of the object) is selected at 316 for testing against the depth buffer at 318. As noted above, the world space coordinates of elements of the object are modified per the above offset depth. In other words, the depth value for each object is adjusted based on the offset that has been defined for the given object. If there are no pixels left to test for this object, then the next object in the layer is selected.

At 320, if the calculated depth (taking into account the offset depth from 312 as well) is closer to the viewpoint (e.g., a position of the virtual camera or a position based on that position) than the current value in the depth buffer, then that depth is written to the depth buffer at 322. If the calculated depth is not smaller, then the next pixel (or other element of the object) is selected for testing.

It will be appreciated that any or all of elements 314-322 (and other elements described in FIG. 3) may be performed on a GPU in certain example embodiments and accordingly the processing for these steps may be performed on the hardware of the GPU. As an illustrative example, the testing of the depth buffer for the pixels/objects may occur in parallel using the processing capabilities of a GPU. Accordingly, the techniques herein may be applied to different types of hardware architectures.

Note that the value that is written to the depth buffer may not be an absolute value. Rather, in certain examples, the depth buffer may store a value that is proportional or related to its depth in world-space. This value may be, for example, a value between 0 and 1. The value that is written or used in connection with the depth buffer may be based on a projection matrix that includes values for the virtual camera that is being used (e.g., near/far/field of view values, etc.). Depth buffer values may also be based on the bit depth that is used for the depth buffer (e.g., 24 bit, 32 bit, etc.). The depth buffer values may also be non-linear—with each unit step in the depth buffer resulting in further depth (e.g., at an exponential rate) within the scene in world space.

In some examples, when a new value is written to the depth buffer, then the color values for that pixel are also determined and written to the color buffer at 324. The color values may be, for example, the RGB values of the corresponding pixel. In other examples, the depth buffer may be filled first before generating the color buffer.

Returning to 314, once each object in the selected layer has been processed (e.g., 316-324), then the process selects the next layer and repeats the processing from 312-324 for that layer. As noted above, there may be multiple different layers (e.g., 3, 4, 5, or 6 or more) layers within a given scene.

Once all the layers are processed (or the process determines that no other layers need to be processed), then, at 330, additional processing for generating and outputting of the image as part of the video game may be performed. It will be appreciated that other processing steps may be performed before, during, or after the processing shown in FIG. 3 in connection with the generation of the image that is displayed to the user as part of the video game.

In certain example embodiments, the objects within a scene may be processed in any order for the steps discussed in FIG. 3. For example, an object in the first layer may be processed, then an object in a second layer, then another object in the first layer. Accordingly, not all objects within a given layer need be processed before moving onto another layer. In certain examples, objects/pixels may be processed in parallel (e.g., depending on hardware implementation on a GPU or the like).

Description of FIG. 4

FIG. 4 graphically illustrates how example virtual objects are located within world space coordinates of an example virtual game space according to certain example embodiments. The plurality of virtual objects shown in FIG. 4 may correspond to those shown in the examples discussed in connection with FIGS. 2A-2C (e.g., 400 corresponds to 200, 402 to 202, 404 to 204, and 406 to 206). The view shown in FIG. 4 is provided as an overhead view of multiple objects located within a virtual space. The objects are arranged at the same z-depth from a virtual camera 300 and along the same plane of the y-axis.

As discussed in connection with FIG. 3, the objects arranged within a scene may be tested to determine the widest width of the objects with the scene. In this case 400 is the object with the widest width and accordingly the w parameter that is set in FIG. 3 is determined.

In certain examples, the process may determine the widest width of each object of each layer. Thus, for example, if 400 is in a first layer and 402, 404, and 406 are in a second layer, then the width used for the first layer will be the width of 400 and the width used for the second layer will be 402 (e.g., the widest object within the second layer). The offset for the respective layer may then be used to generate the offset for objects within that layer.

In certain examples, the assignment of objects to a layer can be dynamic and based on gameplay elements within the video game and/or user provided input. In other words, objects can be assigned to different layers at different points in time during gameplay. As an illustrative example, suppose a ladder object is added that connects two terrain elements within a scene (e.g., that connects 250 and 252). As a character is moving through the scene, they may be rendered in a character layer (as discussed above) while the two terrain elements are rendered in the terrain layer, and the ladder in the static object layer. When the character reaches a position that is in front of where the ladder is located, the character is then drawn in front of the ladder (because the two are in different layers).

If the user wishes to interact with the ladder (e.g., to go up the ladder) they may provide an input (e.g., press a button on a controller). In this case the, the character object may be dynamically adjusted to be drawn in the static ladder. This may allow for the character to be rendered in a manner that shows the character interacting with the ladder. Once the character has climbed the ladder and is no longer interacting with it, then the character may be placed back into the character layer (or other layer) as appropriate.

In certain examples, the objects within a scene may be located along different z-depths (e.g., may be relatively minor compared to the z-depth of the three-dimensional game space) with the virtual game space. Referring to the ladder example above, if the ladder and game character are at the same z-coordinates, then the character will clip through the ladder as they are climbing the ladder. Also, if the character is placed into a different layer than the ladder (e.g., the character layer), then the ladder will be behind the character and the interaction may look odd or not correct. Accordingly, in certain examples, the z-position in world space positions of objects with the virtual game space may be slightly offset depending on the interaction that two or more objects may have within the scene. Having the game character rendered just in front of the ladder (and using the same layer) may allow for mimicking the player character to climb the ladder.

As noted above, the objects within a scene may be dynamically assigned to one of multiple different layers. The assignment of objects to a given layer may be responsive to or based on reception of an input from a player. For example, if a user is playing the video game and the user provides and input (e.g., presses a button) with the intention of having the controlled character interact with an object within the scene, then the character may be placed into the same layer as that object (e.g., as discussed in the ladder example above). In other examples, the object that is being interacted with may be placed into the same layer as the player character. When the interaction is concluded, then the objects may return to their original layers.

In certain example embodiments, the assignment of an object to a given layer may be automatic (e.g., without expressly requiring input from the user) based on one or more elements within the game. For example, during a game a non-player character may be automatically moved between layers as it is revealed to the player and then hidden from the player. This type of processing may allow for new and interesting effects to be presented to game players at they play. Accordingly, the game scene may include triggers or other elements that control how objects within that scene are assigned to layers. In some examples, the assignment of objects to layers may be based on a timer expiring, the movement of the virtual camera (or a change in viewing direction of the virtual camera). A technical advantage of this type of implementation is that the hardware-based depth buffer (e.g., of a GPU) can be used to facilitate the sorting/rendering of objects within a scene. This allows for faster processing over manual sorting that may exist in, for example, the 2D quad implementation discussed above.

As discussed herein, the gameplay that is provided, in certain examples, is two-dimensional gameplay that only allows a character to move horizontally or vertically within the game space that is displayed to the user. In other words, gameplay is restricted along a two-dimensional plane. In certain example embodiments, the two-dimensional plane may be defined as a fixed distance away from the virtual camera.

In certain example embodiments, such two-dimensional gameplay includes so-called 2.5-dimensional gameplay that, while movement is still primarily restricted along a two-dimensional plane, allows a small amount of depth in the game play. An illustrative example of this may be having 254 from FIG. 2B disappear behind 252 in some situations. In that type of example, 254 has move "back" in the game space. However, in certain example embodiments, it will be appreciated that the degree of freedom in the x and y planes will be substantially greater than in the z plane.

Figure 5:
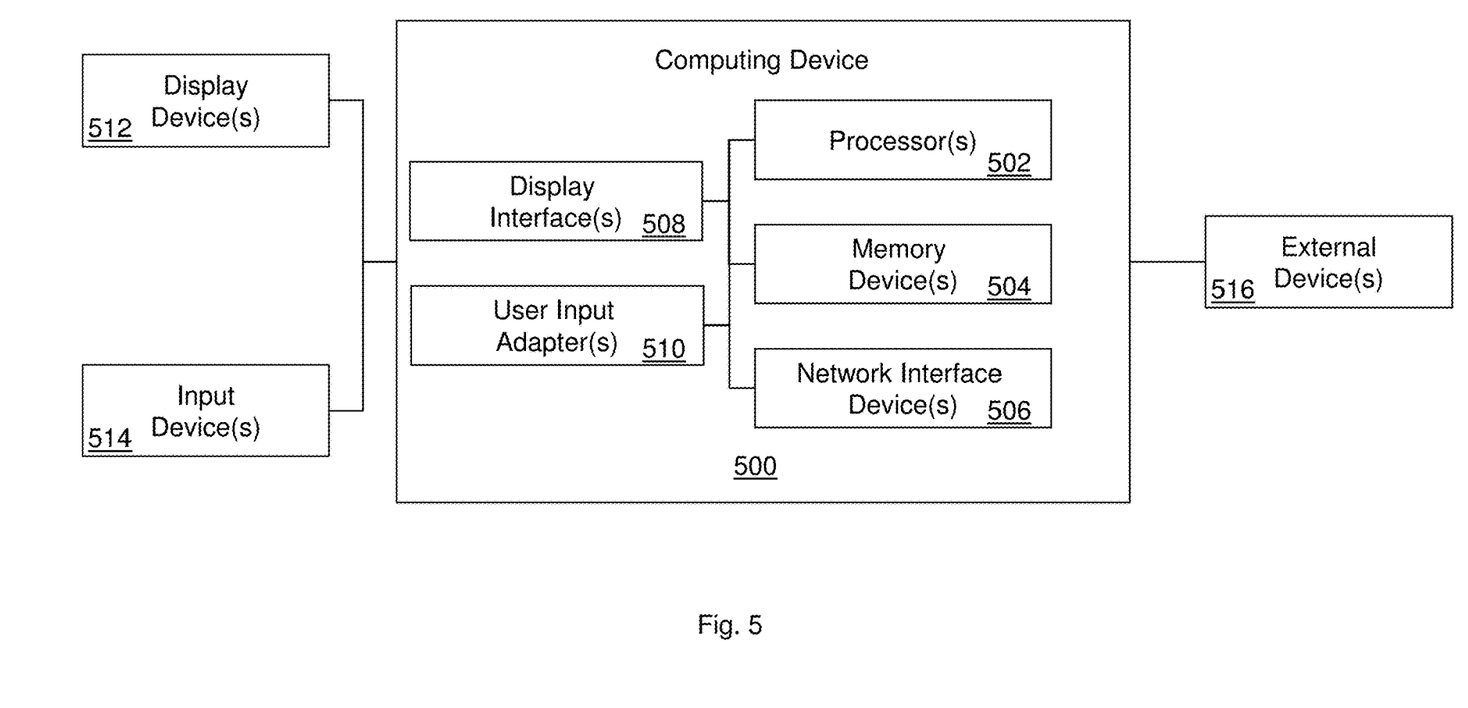
FIG. 5 shows an example computing device that may be used in some embodiments to implement features described herein.

Description of FIG. 5

FIG. 5 is a block diagram of an example computing device 500 (which may also be referred to, for example, as a "computing device," "computer system," or "computing system") according to some embodiments. In some examples, the computing device 500 may be referred to as a game device or game system. In some examples, the computing device 500 may include or store (e.g., to memory devices 504) a game program (e.g., a video game application program) that includes or has access to game data and a rendering module. The video game application program may be executed by the computing device 500 and include one or more computer processes or threads of execution.

The game data may be stored in memory devices 504 and may include data for virtual objects to be rendered three-dimensional mesh data, or mesh data, and asset information that may be loaded and used by the game program to play the video game. The rendering module may include code to implement the functionality shown in FIG. 3. As will be appreciated, additional elements for additional rendering operations may also be included and handled by the rendering module. In some examples of additional processing may include lighting, animations, culling, and the like. The game program may also include a game program logic module. This module may define different rules of the video game and how objects can be controlled by users and the like.

In some embodiments, the computing device 500 includes one or more of the following: one or more processors 502 (which may be referred to as "hardware processors" or individually as a "hardware processor"); one or more memory devices 504; one or more network interface devices 506; one or more display interfaces 508; and one or more user input adapters 510. Additionally, in some embodiments, the computing device 500 is connected to or includes a display device 512. As will explained below, these elements (e.g., the processors 502, memory devices 504, network interface devices 506, display interfaces 508, user input adapters 510, display device 512) are hardware devices (for example, electronic circuits or combinations of circuits) that are configured to perform various different functions for the computing device 500. In some embodiments, these components of the computing device 500 may be collectively referred to as computing resources (e.g., resources that are used to carry out execution of instructions and include the processors (one or more processors 502), storage (one or more memory devices 504), and I/O (network interface devices 506, one or more display interfaces 508, and one or more user input adapters 510). In some instances, the term processing resources may be used interchangeably with the term computing resources. In some embodiments, multiple instances of computing device 500 may arranged into a distributed computing system.

In some embodiments, each or any of the processors 502 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 502 uses an instruction set architecture such as x86 or Advanced RISC Machine (ARM).

In some embodiments, each or any of the processors 502 is or includes, for example, a graphical processing unit (GPU), which may be an electronic circuit designed to generate images and the like. As discussed herein, a GPU may include one or more specialized buffers, such as a depth buffer, that may be used to assist in rendering images for display. The use of hardware resources of a GPU may be faster or more efficient than equivalent software implementations that are executed on a CPU.

One or more of the processors 502 may be referred to as a processing system in certain examples. In some examples, a processing system may include memory devices 504 that store computer executable instructions that are executed by one or more of the processors 502.

In some embodiments, each or any of the memory devices 504 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 502). Memory devices 504 are an example of non-transitory computer-readable storage. Memory devices as discussed herein may include memory that is provided on the same "die" as the processor (e.g., that is internal to the die that the processor is located on) and memory that is externally provided to the die that includes the processor. Examples of "on die" memory may include cache and registers whereas "off die" or external memory may include DRAM. As discussed herein, on die memory in the form of cache or registers may provide faster access at a tradeoff of being more expensive to produce.

In some embodiments, each or any of the network interface devices 506 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 506 may include ports or other connections that enable such connections to be made and communicate data electronically among the various components of a distributed computing system.

In some embodiments, each or any of the display interfaces 508 is or includes one or more circuits that receive data from the processors 502, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 512, which displays the image data. Alternatively, or additionally, in some embodiments, each or any of the display interfaces 508 is or includes, for example, a video card, video adapter, or graphics processing unit (GPU). In other words, each or any of the display interfaces 508 may include a processor therein that is used to generate image data. The generation or such images may occur in conjunction with processing performed by one or more of the processors 502.

In some embodiments, each or any of the user input adapters 510 is or includes one or more circuits that receive and process user input data from one or more user input devices (514) that are included in, attached to, or otherwise in communication with the computing device 500, and that output data based on the received input data to the processors 502. Alternatively, or additionally, in some embodiments each or any of the user input adapters 510 is or includes, for example, a PS/2 interface, a USB interface, a touchscreen controller, or the like; and/or the user input adapters 510 facilitates input from user input devices 514.

In some embodiments, the display device 512 may be a Liquid Crystal Display (LCD) display, Light Emitting Diode (LED) display, or other type of display device. In embodiments where the display device 512 is a component of the computing device 500 (e.g., the computing device and the display device are included in a unified housing), the display device 512 may be a touchscreen display or non-touchscreen display. In embodiments where the display device 512 is connected to the computing device 500 (e.g., is external to the computing device 500 and communicates with the computing device 500 via a wire and/or via wireless communication technology), the display device 512 is, for example, an external monitor, projector, television, display screen, etc.

In some embodiments, each or any of the input devices 514 is or includes machinery and/or electronics that generates a signal that is provided to the user input adapter(s) 510 in response to physical phenomenon. Examples of input devices 514 include, for example, a keyboard, a mouse, a trackpad, a touchscreen, a button, a joystick, a sensor (e.g., an acceleration sensor, a gyro sensor, a temperature sensor, and the like). In some examples, one or more input devices 514 generate signals that are provided in response to a user providing an input—for example, by pressing a button or actuating a joystick. In other examples, one or more input devices generate signals based on sensed physical quantities (e.g., such as force, temperature, etc.). In some embodiments, each or any of the input devices 514 is a component of the computing device (for example, a button is provided on a housing that includes the processors 502, memory devices 504, network interface devices 506, display interfaces 508, user input adapters 510, and the like).

In some embodiments, each or any of the external device(s) 516 includes further computing devices (e.g., other instances of computing device 500) that communicate with computing device 500. Examples may include a server computer, a client computer system, a mobile computing device, a cloud-based computer system, a computing node, an Internet of Things (IoT) device, etc. that all may communicate with computing device 500. In general, external devices(s) 516 may include devices that communicate (e.g., electronically) with computing device 500. As an example, computing device 500 may be a game device that communicates over the Internet with a server computer system that is an example of external device 516. Conversely, computing device 500 may be a server computer system that communicates with a game device that is an example external device 516.

In various embodiments, the computing device 500 includes one, or two, or three, four, or more of each or any of the above-mentioned elements (e.g., the processors 502, memory devices 504, network interface devices 506, display interfaces 508, and user input adapters 510). Alternatively, or additionally, in some embodiments, the computing device 500 includes one or more of: a processing system that includes the processors 502; a memory or storage system that includes the memory devices 504; and a network interface system that includes the network interface devices 506. Alternatively, or additionally, in some embodiments, the computing device 500 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 502 and the network interface devices 506; or the single SoC (or the multiple SoCs) may include the processors 502, the network interface devices 506, and the memory devices 504; etc.

The computing device 500 may be arranged in some embodiments such that: the processors 502 include a multi or single-core processor; the network interface devices 506 include a first network interface device (which implements, for example, WiFi, Bluetooth, NFC, etc.) and a second network interface device that implements one or more cellular communication technologies (e.g., 3G, 4G LTE, CDMA, etc.); the memory devices 504 include RAM, flash memory, or a hard disk. As another example, the computing device 500 may be arranged such that: the processors 502 include two, three, four, five, or more multi-core processors; the network interface devices 506 include a first network interface device that implements Ethernet and a second network interface device that implements WiFi and/or Bluetooth; and the memory devices 504 include a RAM and a flash memory or hard disk.

As previously noted, whenever it is described in this document that a software module or software process performs any action, the action is in actuality performed by underlying hardware elements according to the instructions that comprise the software module.

Consistent with the preceding paragraph, as one example, in an embodiment where an instance of the computing device 500 is used to implement a game device, the memory devices 504 could load and/or store a game program that is played by a user on a game device. Processors 502 (e.g., a combination of processing by a CPU and GPU) could be used to operate the rendering module of the game program, and Display devices 512 (e.g., an LCD or the like) may be used to output images that are based on performance or execution of the game program. Video game controllers may be an example of input device 514 and used to allow users to provide input that is then processed by the user input adapter 510 and/or the game program that is being played by the user.

The hardware configurations shown in FIG. 5 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 5, (e) via other hardware arrangements, architectures, and configurations, and/or via combinations of the technology described in (a) through (e).

Technical Advantages of Described Subject Matter

In certain example embodiments, techniques for generating three-dimensional scenes that can be used in connection with two-dimensional gameplay are provided. The techniques discussed herein provide for increased (e.g., full) control over the visual order in which objects within the scene are rendered relative to the position of the virtual camera.

In certain examples, the visual order of the objects within the scene may be changed dynamically, automatically, or be user driven. This allows for logic within the scene to control the visual order of how objects are presented. It also allows for new and interesting techniques of handling interactions (or avoiding interactions) between objects within a scene. If it is desired to visually depict an interaction, then the objects within a scene may be moved to the same layer. In contrast (and possibly for the same two objects that previously had an interaction), if no such interaction is desired, then the objects may be moved to different layers.

The techniques discussed herein can (and do) leverage use of GPU hardware depth buffers. This is a technical advantage over manually sorting the objects within a scene, which may, and typically would not, be as fast as using a GPU provided depth buffer.

In certain example embodiments, the techniques herein for generating three-dimensional scenes for two-dimensional game play may require fewer draw calls than other methods that may use techniques that overwrite the depth buffer. In other words, other techniques used in connection with two-dimensional gameplay may use multiple passes or multiple draw calls that overwrite data in the depth buffer in order to ensure that some objects are visually pushed to the front (e.g., the object is always seen). In contrast to such other techniques, in connection with certain example embodiments herein, the rendering of a scene can be accomplished with a fewer draw calls (e.g., a single draw call/one). Such techniques may not require overwriting the depth buffer as with other techniques. In certain examples, this allows for using a single depth buffer (or testing once against a single buffer for each rendering process) as opposed to using multiple depth buffers according to certain prior techniques. It will be appreciated that the techniques discussed herein thus provide a technical advantage of prior techniques in that generation of an image may require fewer draw calls, use of a single depth buffer, or a single pass against the depth buffer during the rendering process.

In certain examples, the techniques herein allow for easier reuse of graphical assets in games. For example, the meshes for 3D objects from other games that operated in a fully three-dimensional game space (or in a two-dimensional space) may be repurposed into a game that provides 2D gameplay. Due to the control of the virtual game space and the view order of the objects with the virtual space, a new way of using such objects may be provided.

In certain example embodiments, perspective polygon offset techniques may be applied to different types of rendering engines or pipelines. As an illustrative example, the techniques may be used in pipelines where the order in which objects are drawn is not performed from front to back. Instead, the order may be random or based on other considerations. In other examples, the order may be from front to back with objects in layers closer to the camera drawn first. Such an implementation may provide performance or efficiency benefits. The perspective polygon offset techniques also are adaptable to preexisting rendering renders/rendering engines (e.g., that already have a defined draw order for the objects/order in which objects are drawn).

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

ADDITIONAL APPLICATIONS OF DESCRIBED SUBJECT MATTER

Although process steps, algorithms or the like, including without limitation with reference to FIG. 3, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
   a memory device configured to store three-dimensional object data for a plurality of virtual objects that are to be positioned within a three-dimensional game space;
   a processing system comprising instructions that, when executed by at least one hardware processor of the processing system, cause the at least one hardware processor to perform operations comprising:
      executing a video game application program;
      as part of the video game application program, arranging the plurality of virtual objects within the three-dimensional game space;
      as part of the video game application program, locating a virtual camera in the three-dimensional game space to view the plurality of virtual objects from a perspective viewpoint;
      assigning each one of the plurality of virtual objects to one of a plurality of different layers;
      as part of a render process of generating an image of the three-dimensional game space for the video game application program, offsetting a depth buffer value that is used for each object of the plurality of objects when tested against a depth buffer, wherein an amount that each object is offset is based on which one of the plurality of layers that the object is assigned; and
      outputting the generated image to a display device.

2. The computer system of claim 1, wherein the operations further comprise repeating the render process at least 30 times per second.

3. The computer system of claim 1, wherein the operations further comprise:
   processing input provided by a user using an input device that is coupled to the computer system; and
   controlling at least one of the plurality of virtual objects within the three-dimensional game space to move to another position with the three-dimensional game space.

4. The computer system of claim 3, wherein the at least one of the plurality of virtual objects is controllable by the user to only move in x and y directions within the virtual game space.

5. The computer system of claim 3, wherein the video game application program does not process input that changes how far the at least one of the plurality of virtual objects is from the virtual camera in world space coordinates of the virtual game space.

6. The computer system of claim 1, wherein the operations further comprise:
   calculating an offset value that is based a width of one of the plurality of virtual objects having the widest z width,
   wherein the depth value that is used for each corresponding object for the buffer is offset by the offset value in combination with the one of the plurality of layers that the corresponding object is assigned.

7. The computer system of claim 6, wherein calculation of the offset value is performed as part of the render process to generate the image and is performed each time a new image is generated.

8. The computer system of claim 1, wherein the offsetting is performed without changing world space position(s) of the plurality of objects.

9. The computer system of claim 1, wherein a yaw value and a pitch value of the virtual camera is fixed for the video game application program, wherein the operations further comprise:
   laterally moving the virtual camera to follow at least one of the plurality of virtual objects.

10. The computer system of claim 1, wherein the render process is performed for a plurality of frames, wherein the operations further comprise:
    changing, from one of the plurality of frames to another of the plurality frames, which of the plurality of layers that a first object of the plurality of objects is assigned to.

11. The computer system of claim 10, wherein the operations further comprise:
    processing input provided by a user using an input device that is coupled to the computer system, wherein changing which layer the first object is assigned is based on processing the input provided by the user.

12. The computer system of claim 10, wherein changing which layer the first object is assigned is based on triggering a condition within the video game application program to automatically change the layer that the first object is assigned.

13. The computer system of claim 1, wherein the plurality of different layers is at least 5 different layers.

14. The computer system of claim 1, wherein at least two of the plurality of virtual objects are located at positions within the three-dimensional game space that at least partly overlap or clip into one another within the three-dimensional game space.

15. The computer system of claim 14, wherein one of the at least two of the plurality of virtual objects is displayed in the image as being completely in front of the other ones of the at least two of the plurality of virtual objects without clipping into the other ones of the at least two of the plurality of virtual objects.

16. The computer system of claim 1, wherein the memory device is further configured to store a category attribute for each one of the plurality of virtual objects,
    wherein each one of the plurality of virtual objects is assigned to one of the plurality of different layers based on the category attribute for the corresponding object.

17. The computer system of claim 1, wherein the depth buffer is provided on a graphical processing unit (GPU).

18. A computer program product stored to a non-transitory storage medium, the computer program product for execution by a computer system that includes at least one hardware processor, the computer program product comprising instructions that are configured to cause the at least one hardware processor to perform operations comprising:
    accessing three-dimensional object data for a plurality of virtual objects that are to be positioned with a three-dimensional game space;
    executing a video game application program;
    as part of the video game application program, arranging the plurality of virtual objects within the three-dimensional game space;
    as part of the video game application program, locating a virtual camera in the three-dimensional game space to view the plurality of virtual objects from a perspective viewpoint;
    assigning each one of the plurality of virtual objects to one of a plurality of different layers;
    as part of a render process of generating an image of the three-dimensional game space for the video game application program, offsetting a depth buffer value that is used for each object of the plurality of objects when tested against a depth buffer, wherein an amount that each object is offset is based on which one of the plurality of layers that the object is assigned; and
    outputting the generated image to a display device.

19. The computer program product of claim 18, wherein the render process is performed for a plurality of frames, wherein the operations further comprise:
    changing, from one of the plurality of frames to another of the plurality frames, which of the plurality of layers that a first object of the plurality of objects is assigned to.

20. A method for execution on a computer system, the method comprising:
    accessing three-dimensional object data for a plurality of virtual objects that are to be positioned with a three-dimensional game space;
    executing a video game application program;
    as part of the video game application program, arranging the plurality of virtual objects within the three-dimensional game space;
    as part of the video game application program, locating a virtual camera in the three-dimensional game space to view the plurality of virtual objects from a perspective viewpoint;
    assigning each one of the plurality of virtual objects to one of a plurality of different layers;
    as part of a render process of generating an image of the three-dimensional game space for the video game application program, offsetting a depth buffer value that is used for each object of the plurality of objects when tested against a depth buffer, wherein an amount that each object is offset is based on which one of the plurality of layers that the object is assigned; and
    outputting the generated image to a display device.

* * * * *